United States Patent

[11] 3,599,768

| [72] | Inventor | Patrick W. Connolly |
| | | Detroit, Mich. |
| [21] | Appl. No. | 782,917 |
| [22] | Filed | Dec. 11, 1968 |
| [45] | Patented | Aug. 17, 1971 |
| [73] | Assignee | Visi-Trol Engineering Company |
| | | Detroit, Mich. |

[54] COMPOSITE TRACK AND METHOD OF MAKING SAME
8 Claims, 4 Drawing Figs.

[52] U.S. Cl............................................. 193/25 FT,
29/211 R, 46/1 K
[51] Int. Cl....................................................... B65g 11/10
[50] Field of Search.......................................... 193/25, 43
A; 238/10; 46/43, 202, 206, 216, 1; 194/1.8 M;
133/1; 198/109, 33 R; 29/211; 221/156; 138/103,
106—108; 302/64—65

[56] References Cited
UNITED STATES PATENTS

| 1,208,884 | 12/1916 | Abbott | 138/107 X |
| 2,346,549 | 4/1944 | Belada | 198/33 (R3) |
| 2,862,333 | 12/1958 | Gardiol | 46/202 |
| 3,253,416 | 5/1966 | Madison | 198/204 X |
| 3,081,885 | 3/1963 | Carlzen et al. | 193/25 X |
| 3,284,947 | 11/1966 | Dahl | 46/161 X |

Primary Examiner—Evon C. Blunk
Assistant Examiner—W. Scott Carson
Attorney—Hauke, Gifford and Patalidis ABSTRACT: A method for fabricating a composite track defining an irregular path for transferring a series of similarly shaped, oriented articles between a pair of stations. The composite track comprises a nonresilient strip formed into the desired irregular path and retaining the shape of the irregular path, and a resilient, elongated and generally U-shaped member attached to the nonresilient strip thereby defining a channel between the nonresilient strip and the resilient member for guiding preoriented objects along the irregular path.

PATENTED AUG 17 1971 3,599,768
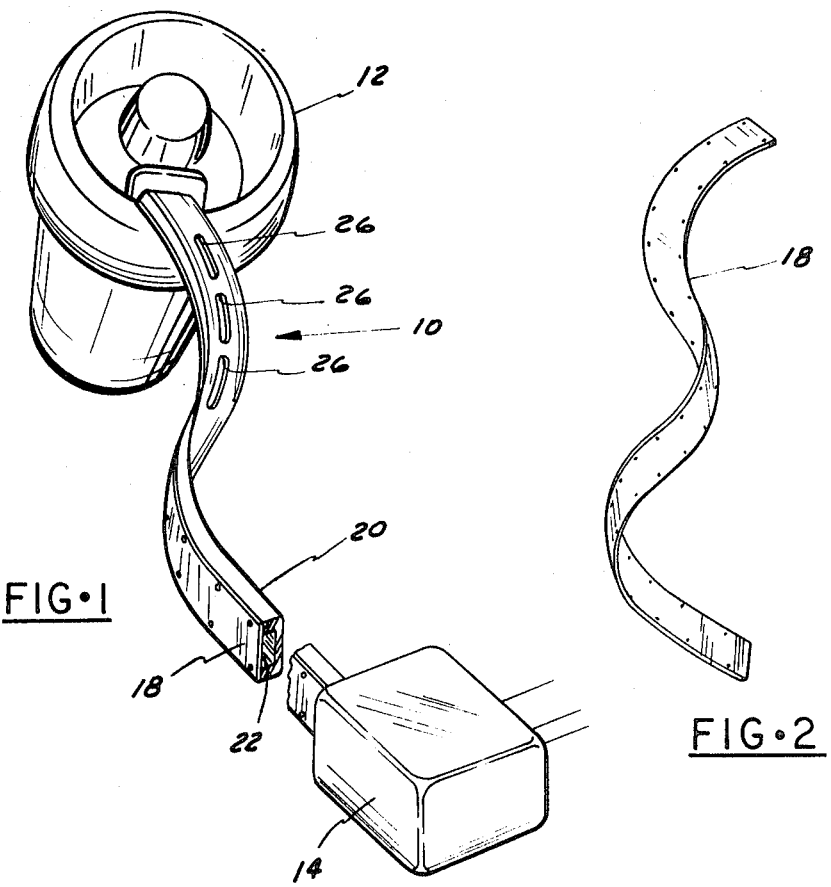
FIG·1
FIG·2
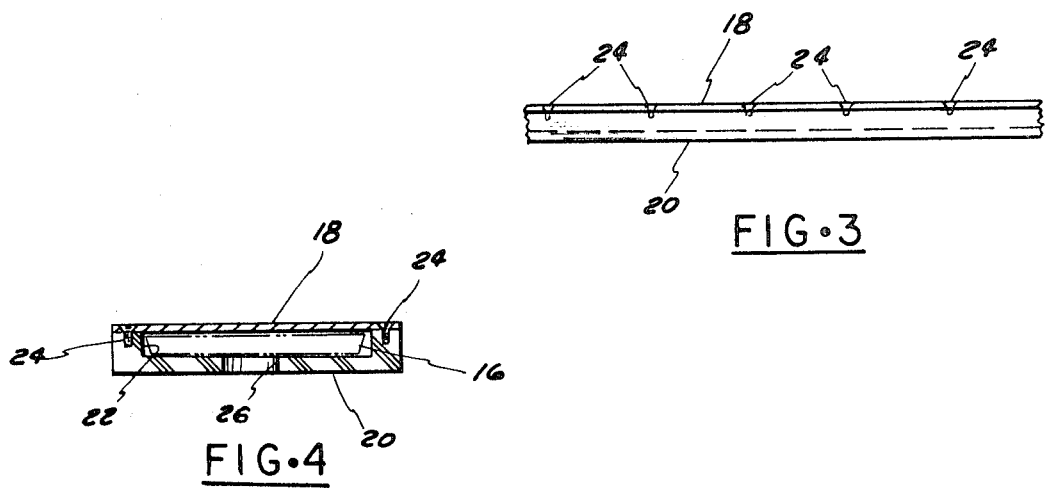
FIG·3
FIG·4
INVENTOR
PATRICK W. CONNOLLY
BY
Attorneys

COMPOSITE TRACK AND METHOD OF MAKING SAME

BACKGROUND OF THE INVENTION

This invention relates to tracks for transferring a series of oriented articles between a pair of stations, and more particularly to a method for making a composite track which defines an irregular or twisted path with a minimum of path distortion by joining two elongated elements together along their length.

In order to transfer a series of identically shaped manufacturing components such as rivets, washers and the like, from a feed station in which the components are oriented, to a tooling station which receives them in their preoriented position, it is common practice to employ an elongated track that is longitudinally deformed such that one end can be connected to the outlet of the feed station, and its opposite end can be connected to the tooling station. Often the track must be both bent as well as twisted about its longitudinal axis in order to accommodate the relative orientation of the two stations.

Commercially available tracks have a channel-shaped or substantially closed cross section suited for the configuration of the particular component being transferred. The track is usually cut to length, bent and twisted, and then its ends suitably fastened to the two stations. Such tracks are formed by various, conventional techniques. For instance, one form of track is extruded from a suitable plastic such as nylon so that it has a uniform cross secton throughout its length.

Another form of commercially available track has a continuous series of C-shaped, metal, wire elements bonded in a rubber sleeve in such a manner that the track, although stiff transverse to the path of the components, is longitudinally flexible.

The problem with present commercial methods is that if the track is relatively stiff in the direction in which it is twisted, or bent, the cross section of the track tends to become distorted. The components then have a tendency to hang up in the distorted section if the track is flexible and has any substantial thickness because different sections assume different curvatures depending on their distance from the center of curvature.

SUMMARY OF THE INVENTION

The broad purpose of the present invention is to provide a track that can be formed to define a bent or twisted longitudinal path without a substantial change in its transverse cross section.

The preferred method employs at least two elongated elements to form a track. One element is relatively stiff, and preferably comprises a metal band. Although preferably having a flat, cross section, the band could be ribbed for additional stiffness. Initially the band is longitudinally bent and twisted to define the components's path. The second element, formed with a flexible configuration of a urethane plastic, is then attached to the deformed band so that the composite structure forms the track passage. The metal band, in addition to providing a suitable track stiffness, also provides a long wearing surface on which the components can slide in response to a vibratory source of motion. The flexible element is preferably extruded with a cross section complementary with the flat band surface so that the composite cross section accommodates the shape of the components being passed.

The preferred method provides a track having several advantages. The metal band is easily bent because of its relatively flat cross section. The flexible half of the track is easy to mount on the band, even though it may have an unusual cross section. When both elements are joined together, the composite passage has a substantially uniform cross section throughout its length because the bending distortion, associated with a unitary track, is obviated.

Still other advantages of the invention will become readily apparent to those skilled in the art to which the invention pertains upon reference to the following detailed description.

DESCRIPTION OF THE DRAWINGS

The description refers to the accompanying drawing in which like reference characters refer to like parts throughout the several views, and in which:

FIG. 1 is a perspective view showing a composite track, constructed in accordance with the preferred method, mounted to pass a series of similarly formed, oriented articles from a feed station to a tooling station;

FIG. 2 is a view showing the metal band after it has been bent and twisted to define the track passage;

FIG. 3 is a fragmentary view of a portion of the two halves of the track joined together; and FIG. 4 is a transverse cross section of the track of FIG. 1.

DESCRIPTION OF PREFERRED EMBODIMENT

Referring to the drawing, FIG. 1 shows a track 10 built in accordance with the preferred method and mounted on an assembly machine. The inlet end of track 10 is connected to a vibratory feed device 12 which orients a plurality of metal fastener components before discharging them individually through the track. The oriented components are passed by the track 10 to a tool 14. For purposes of description, each component 16 has a disc-shaped configuration with a relatively flat cross section, as illustrated in FIG. 4. As the components move along the track, their orientation relative to the tool is changed by 90°. Since the passage defined by the track is substantially uniform along its full length, the track 10 is bent as well as twisted about its longitudinal axis.

The track 10 is formed of two basic elements including an elongated flat band 18 and an elongated, flexible element 20. Band 18 is preferably a steel band that is cut to a suitable length and then bent, as shown in FIG. 2, to define the path the components 16 are to take from the feed device 12 to the tool 14. The band 18 has a substantially flat surface providing a slidable surface for the components 16 as they are moved along the track. Although preferably of metal, the bank 18 could be formed of a relatively stiff plastic material such as urethane. Because of its relatively flat cross section, the bank 18 can be easily bent and twisted to its final configuration.

The flexible element 20 is formed of a suitable plastic material such as urethane, and has a cross section complementary to one side of the band 18 so as to form a composite passage 22 that maintains the orientation of the components 16, relative to the track, unchanged as they move from the track's inlet toward its outlet. Although the element 20 is preferably extruded with a suitable groove or channel, it could also be machined from a strip of flat plastic stock.

The composite passage 22 has a substantially uniform dimension throughout its length because the two track components are bent and twisted independently of one another. They are securely joined together along the side edges by fasteners 24. A series of slots 26, formed in the plastic element 20, provide both an access and an observation means along at least a portion of the track.

Thus it is to be understood that I have described a composite track 10 formed of a pair of elongated components, one of which is relatively stiff and initially bent to define the path the components 16 are to follow. The flexible element easily follows the longitudinal configuration of the metal band so that the distortion associated with a unitary track is obviated.

Having described my invention, I claim:

1. A track suited for passing similarly formed articles, comprising:
    an elongated metal band member bent about its longitudinal axis to a predetermined longitudinal configuration;
    an elongated flexible member formed from a plastic material;
    one of said members defining a channel; and
    means for directly securing the other of said members to said one member to enclose said channel to define an elongated passage for passing a series of similarly shaped articles in a predetermined orientation relative to the band member, whereby said track is adapted to be formed into different shapes and will hold said shapes.

2. The track as defined in claim 1 wherein said elongated flexible member defines said channel.

3. The track as defined in claim 1 wherein said one member has a substantially U-shaped cross section, the legs of said U-shaped member being directly secured to said band member to form said passage along the length of said band member.

4. The track as defined in claim 3 wherein said U-shaped member is extruded from a plastic material.

5. The track as defined in claim 1 wherein one of said members is formed with slots spaced along its length to provide access to said passage.

6. The track as defined in claim 1 wherein said elongated flexible member is of a plastic extrusion formed with slots spaced along its length to provide access to said passage.

7. The track defined in claim 1 wherein said band member has a flat surface along its length, and said flexible member has a U-shaped cross section, the legs thereof being attached to said band member, and said flexible member having a complementary surface mounted so as to oppose said band member flat surface to form said passage.

8. The track as defined in claim 1 wherein said means for directly securing said members comprises a threaded member extending through one of said members into a locking engagement with the other of said members.